Patented Nov. 13, 1934

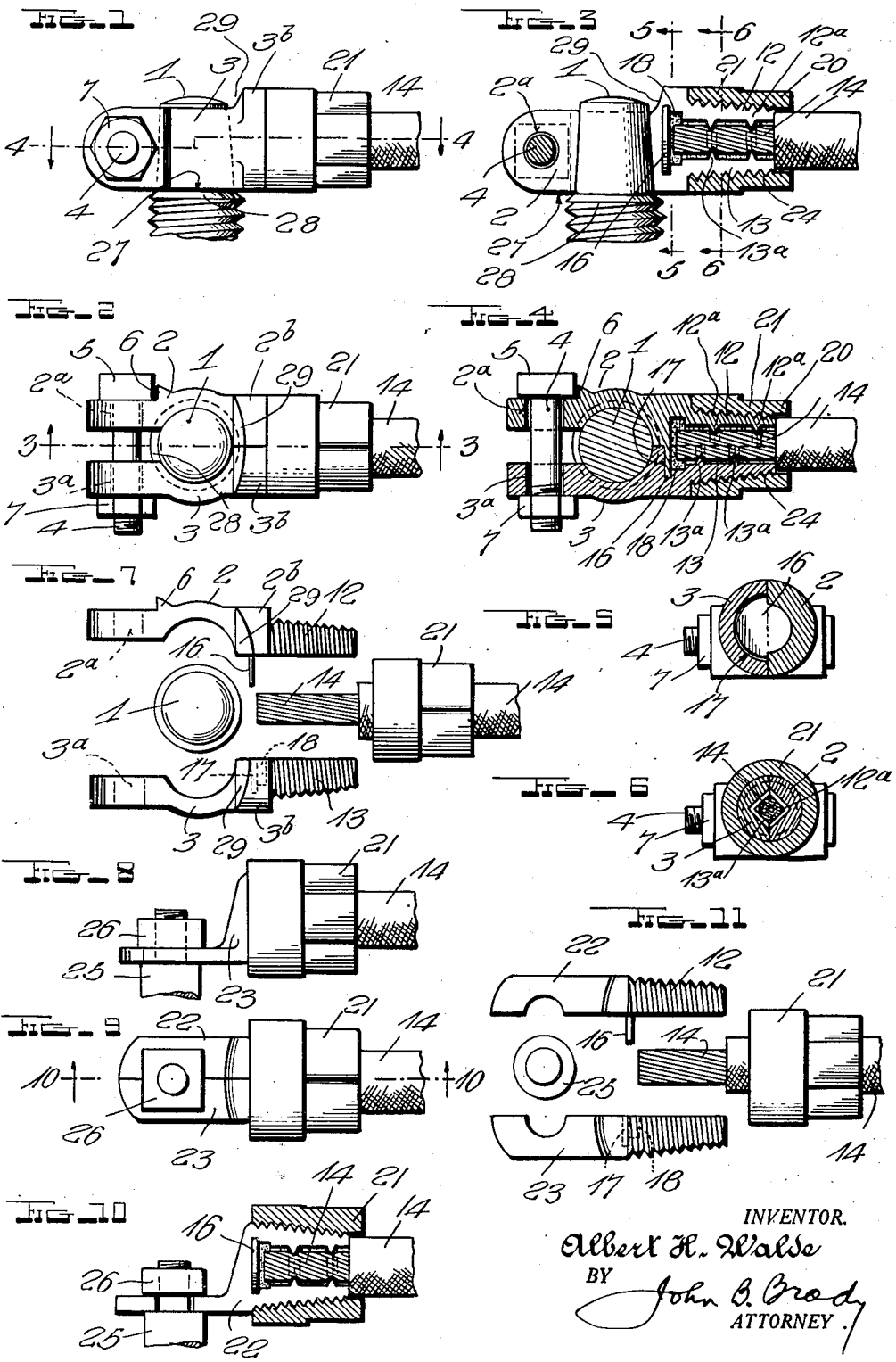

1,980,893

UNITED STATES PATENT OFFICE 1,980,893

CABLE CONNECTER FOR STORAGE BATTERIES

Albert H. Walde, Roxborough, Pa., assignor of one-third to Frank T. Ray and one-third to Charles C. Williams, both of Philadelphia, Pa.

Application May 11, 1932, Serial No. 610,639

5 Claims. (Cl. 173—259)

My invention relates broadly to cable connecters for storage batteries and more particularly to a solderless connecter which is readily attachable to and removable from the post of a storage battery.

One of the objects of my invention is to provide an improved construction of cable connecter for storage batteries which may be readily applied to cables of various sizes and removed from such cables independently of the effects of corrosion.

Another object of my invention is to provide a construction of storage battery terminal which is capable of inexpensive manufacture on a quantity production basis and which is constructed from a minimum number of parts.

Still another object of my invention is to provide a construction of cable connecter for storage batteries which may be readily die cast from non-corrosive metal in order to add to the practicability of the cable connecter when subjected to corrosion after extended use on storage batteries.

A further object of my invention is to provide a construction of cable connecter for storage batteries in which the parts of the connecter are divided longitudinally and are adapted to grip opposite sides of the cable and opposite sides of the storage battery post.

A still further object of my invention is to provide a construction of die cast storage battery terminal in which the end of the cable is protected against the seepage or corrosion and is gripped by a pair of members having a tapered thread thereon adapted to be wedged against the cable in accordance with the movement of an internally screw threaded coupler which establishes electrical connection between the terminal and the cable and also positions parts of the terminal around battery posts of various sizes.

Another object of my invention is to provide a construction of cable connecter for storage battery terminals in which a reservoir for corrosive resisting material is disposed within the connecter for preventing the tendency of the cable to corrode under conditions of use on a storage battery post.

Other and further objects of my invention reside in the construction of a removable connecter for a storage battery post as set forth more fully in the specification hereinafter following by reference to the accompanying drawing, in which:

Fig. 1 is a side elevation of the cable connecter of my invention; Fig. 2 is a plan view of the cable connecter of my invention; Fig. 3 is a longitudinal cross-sectional view taken through the cable connecter of my invention on line 3—3 of Fig. 2; Fig. 4 is a lateral cross-sectional view taken on line 4—4 of Fig. 1; Fig. 5 is a cross-sectional view taken through the cable connecter on line 5—5 of Fig. 3; Fig. 6 is a similar view taken on line 6—6 of Fig. 3; Fig. 7 shows the parts of the cable connecter about to be assembled with respect to a storage battery post; Fig. 8 is a side elevation of an improved construction of lug connecter embodying my invention; Fig. 9 is a plan view of the lug connecter of my invention; Fig. 10 is a cross-sectional view taken through the lug connecter of Figs. 7 and 8 on line 10—10 of Fig. 9; and Fig. 11 is a view showing the parts of the lug about to be assembled beneath a nut carried by a securing bolt.

The cable connecter for storage batteries constructed in accordance with my invention is simple and inexpensive in its construction and may be readily applied to storage battery cables and posts of various sizes. The structure of my invention is adapted both for connecters for storage battery posts and for lugs for establishing connection with the grounded frame and switch of an ignition system, spark plugs, or other equipment. The connecter of my invention is die cast in two parts divided longitudinally along the axis of the cable. The end of the cable is gripped by a pair of semi-cylindrical members which have a tapered screw thread on the surface thereof. These semi-cylindrical screw threaded members serve to isolate the cable from the storage battery post and thus remove the cable from the immediate position at which corrosion is likely to take place. A partition plate member extends laterally across the path of the bore formed between the semi-cylindrical portions of the connecter for limiting the movement of the end of the cable toward the storage battery post and preventing direct contact therewith for reducing the likelihood of corrosion at the cable. The die cast construction of the connecter permits a thread of finer pitch to be formed in the parts of the connecter than has heretofore been possible in various forms of molded storage battery terminals. There are two ways of adjusting the connecter of my invention, that is, by means of a screw threaded coupler which engages the conical shaped threaded portions of the connecter and by means of the bolt member which passes laterally through the ends of the connecter. In removing the cable connecter from a storage battery post, the screw threaded coupler is first removed from the tapered screw threaded parts of the connecter by rotating the coupler to back the coupler off onto the insulation of the connecting cable whereupon the parts of the connecter are free allowing the parts to be spread for a sufficient distance to allow the connecter to be readily removed from the storage battery post without the necessity of applying a tool to the securing nut on the laterally extending bolt which passes through the parts of the connecter. If it is found that the nut on the laterally extending bolt can be moved, such further movement will enable the parts of the connecter to be further spread to facilitate the removal of the connecter from the storage battery post. When the structure of my invention is applied to a lug which may have the parts thereof spread longitudinally in alignment with the axis of the cable connecter, it is possible to remove the lug laterally from the securing bolt and from beneath the nut on the securing bolt by spreading the parts of the lug and sliding the parts of the lug from beneath the nut pursuant to the operation of unscrewing the coupler from the screw threaded parts of the lug.

My improved construction of storage battery terminal provides a reservoir for corrosion resisting material between the cable gripping section and the post gripping section so that the cable is not only isolated from seepage of corrosion from the storage battery by the projecting member on one section extending into a coacting recess in the other section, but corrosion resisting material such as a petroleum product is retained in the cable gripping section for preventing corrosive attack of the cable.

Referring to the drawing in detail, reference character 1 indicates the post of a storage battery around which the parts 2 and 3 of the connecter are assembled as shown more clearly in Fig. 6. The parts 2 and 3 are divided into pairs of coacting sections. That is, a pair of sections arranged to grip opposite sides of the storage battery post 1 and a pair of screw threaded sections having inner faces adapted to grip and establish electrical connection with the end of a storage battery cable. The sections of the connecter, indicated at 2 and 3, have laterally aligned bores 2a and 3a through which the bolt 4 is passed. Bolt 4 has a head 5 thereon adapted to be locked against rotating movement by the obstruction offered by shoulder 6 formed on the part 3 of the connecter. Nut 7 engages screw threaded bolt 4 and is adjustable against part 2 of the connecter. Parts 2 and 3 each have annular flange portions 2b and 3b adapted to be aligned when the parts of the connecter are assembled on opposite sides of the storage battery post 1. The parts 2 and 3 each have coacting frusto conical shaped screw threaded sections 12 and 13 adapted to be aligned on opposite sides of the end of the cable represented at 14. The parts 2 and 3 coact by means of a laterally extending portion 16 which projects into part of the recess 17 in the part 3 of the connecter. Part 2 has a recess 18 therein which is aligned with the recess 17 for forming a reservoir or pocket containing the petroleum product or other corrosive resisting medium represented at 19. The parts 2 and 3 have a lower projecting portion or shoulder 27 which abuts with the screw threaded portion 28 of the storage battery post and serves to raise the terminal away from the battery for reducing the tendency of attack of the parts of the terminal by acid from the battery. The upper portions of the parts 2—3 are cut away as shown at 29. The cable grip formed by the coacting screw threaded parts 12 and 13 is vise-like in contour and is provided with a number of ribs 12a and 13a disposed in staggered relationship to each other, which serve as contact means gripping the sides of the cable 14. The vise-like grip for the cable is constituted by V shaped internal faces which when aligned form a substantially square aperture into which the end of the cable extends, as illustrated more clearly in the cross-sectional view shown in Fig. 6. The internal bore adjacent the post gripping parts of the terminals formed between the tapered screw threaded parts 12 and 13 projects inwardly in the screw threaded parts as represented at 20 for a sufficient distance to provide a pocket or protective housing for the insulation material on the cable 14. When the cable 14 is moved to a position wholly within the connecter as illustrated in Figs. 3 and 4, seepage of acid or corrosive fluids tending to attack the cable 14 is prevented. The portion of the cable 14 from which the insulation is skinned is directly gripped between the aligned ribs 12a and 13a. The extremity of the cable, however, terminates within the reservoir 18 and is protected against the seepage of acid or corrosion by plate member 16 coacting with the end wall of recess 17 for blocking the passage of acid or corrosion into the bore between the screw threaded sections 12 and 13 for preventing attack upon the cable. The plate member 16 which fits into recess 17 also serves to align parts 2—3 against longitudinal displacement. The parts 2 and 3 are cut away on one side thereof.

In order to secure the parts of the connecter upon opposite sides of the cable 14, I provide the screw threaded coupler 21 which is internally screw threaded on a taper as represented at 24 for engaging the tapered screw threaded sections 12 and 13 as shown in Figs. 3 and 4. The exterior of the coupler 21 is provided with tool gripping faces which enable the coupler 21 to be rotated over screw threaded sections 12 and 13 for drawing the screw threaded sections together for tightly gripping the cable 14 between the coacting ribs 12a and 13a formed therebetween.

I have described the connecter of my invention as applied to a storage battery post. I may also employ the principles of my invention in connection with a lug or a connecter for a spark plug or as a terminal connecter for radio apparatus as illustrated in Figs. 8–11. According to the construction of my invention, the lug is formed in two parts, split along the axis of the lug, the parts being represented at 22 and 23. The parts 22 and 23 of the lug embrace opposite sides of the terminal 25 and extend beneath nut 26. The remaining parts of the lug are constructed in a manner similar to the parts 12 and 13 of the cable connecter illustrated in Figs. 1–6. To simplify an explanation of the invention, I have applied similar reference characters to the parts of the lug shown in Figs. 8–11 corresponding to similar parts of the connecter shown in Figs. 1–7. The same coacting recess 17 is provided in which extension 16 is adapted to project. A reservoir 18 for corrosive material is provided immediately adjacent the extension 16 which fits into recess 17. A similar arrangement of contacting faces 12a and 13a (not shown) are employed for gripping the end of the cable 14 within the lug. The external screw threaded parts of the lug are tapered in a manner similar to the taper illustrated in the battery connecter shown in Figs. 1–7. In applying the connecter or lug to a terminal post, the parts are assembled on opposite sides of the terminal post. In the structure of Figs. 1-7, the laterally extending bolt 4 is passed through the parts of the connecter. In Figs 8-11, the nut 26 is tightened against the parts 22—23 of the lug. In each instance, the coupler 21 is screwed into place for wedging screw threaded sections 12 and 13 together and clamping cable 14 to the contacting faces 12a and 13a. After extended use when it may be necessary to remove the connecter or lug, the coupler 21 is removed from the screw threaded parts 12 and 13 by gripping the tool faces of coupler 21 with a suitable tool and backing off on the coupler. This permits a tool such as a chisel or a screw driver to be driven between parts 2 and 3 or parts 22 and 23 for separating the parts for a sufficient distance to enable the connecter to be removed from the storage battery post or to allow the parts of the lug to be removed from beneath the securing nut. By virtue of the ease with which the connecter or lug may be disassembled, the removal of a discharged battery for installation of a fresh battery or the replacement of terminal connections is greatly facilitated.

The connecter of my invention has been found highly practical in its construction and efficient in its manufacture and production, and while I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In a cable connecter for storage batteries, a pair of connecting members adapted to engage opposite sides of a connecting cable and opposite sides of a storage battery post, a plate extending laterally of said connecting members for isolating the end of the connecting cable from the sections of the terminal gripping the storage battery post, and means engageable with said pair of connecting members for moving the connecting members into engagement with the end of said cable.

2. A cable connecter for storage batteries comprising a pair of conductive members having a cable gripping section and a post gripping section, said members being longitudinally aligned with the end of a cable, means engaging said cable gripping sections for tightening said cable gripping sections against opposite sides of the cable, and a member extending across the end of said cable gripping sections and providing abutment for the end of the cable for isolating the end of the cable from the post gripping sections of said connecter.

3. A cable connecter for storage batteries comprising a pair of conductive members having a cable gripping section and a post gripping section, said members being longitudinally aligned with the end of a cable, means engaging said cable gripping sections for tightening said cable gripping sections against opposite sides of the cable, a recess formed at the end of said cable gripping section, means for isolating said cable gripping section from said post gripping section comprising a projection on one of said members adapted to extend into the recess on the other of said members at the end of said cable gripping section.

4. A cable connecter for storage batteries comprising a pair of conductive members arranged longitudinally of the axis of a connecting cable and including a post gripping section and a cable gripping section, means extending over the cable and engaging the cable gripping section for forcing the cable gripping sections of said conductive members into engagement with the cable, a reservoir for corrosion resisting material disposed between said post gripping sections and said cable gripping sections and a plate extending from one of said members adjacent the end of said reservoir into the end of the reservoir in the other of said members for isolating said cable gripping section from said post gripping section.

5. In an electrical terminal, a pair of complementary conductive members each including an attachment portion and a cable gripping portion, a recess in one of said conductive members, a projecting plate carried by the other of said conductive members with said plate projecting into the recess in said coacting conductive member, a cable having the end thereof extending between the cable gripping portions of said complementary conductive members and secured by jaws therebetween, a reservoir for corrosive resisting material disposed immediately adjacent said coacting plate and recess adjacent the end of said cable, and means engaging the cable gripping portions of said complementary conductive members for forcing said portions into engagement with the end of said cable.

ALBERT H. WALDE.

CERTIFICATE OF CORRECTION.

Patent No. 1,980,893.                                                               November 13, 1934.

ALBERT H. WALDE.

It is hereby certified that the above numbered patent was erroneously issued to the inventor said Walde, one-third to Frank T. Ray and one-third to Charles C. Williams as assignees, whereas said patent should have been issued one-half to Frank T. Ray and one-half to Charles C. Williams, both of Philadelphia, Pennsylvania, as assignees of the entire interest in said invention as shown by the records of assignments in this office; and that the said Letters Patent should be read with this correction therein that the same may conform to the record of the case in the Patent Office.

Signed and sealed this 12th day of February, A. D. 1935.

Leslie Frazer

(Seal)                                      Acting Commissioner of Patents.